(12) United States Patent
Chang et al.

(10) Patent No.: US 6,764,584 B2
(45) Date of Patent: Jul. 20, 2004

(54) PROCESS FOR PRODUCING LITHIUM CONCENTRATE FROM BRINE OR SEAWATER

(75) Inventors: I-Long Chang, Hsinchu (TW); Yu-Lin Jiang, Hsinchu (TW); Jer-Yuan Shiu, Hsinchu (TW); Jiunn-Ren Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 94 days.

(21) Appl. No.: 10/274,956

(22) Filed: Oct. 22, 2002

(65) Prior Publication Data

US 2004/0074774 A1 Apr. 22, 2004

(51) Int. Cl.[7] .............................................. B01D 61/44
(52) U.S. Cl. ...................................... 204/523; 204/529
(58) Field of Search ................................ 204/523, 529

(56) References Cited

U.S. PATENT DOCUMENTS 3,063,924 A * 11/1962 Gomella ..................... 210/663
4,636,295 A * 1/1987 Ball et al. ................... 204/529
4,665,049 A * 5/1987 Miyai et al. ................ 502/400

* cited by examiner

*Primary Examiner*—Arun S. Phasge
(74) *Attorney, Agent, or Firm*—Bacon & Thomas, PLLC

(57) ABSTRACT

Two concentration techniques, adsorption and electrodialysis, are combined to enrich lithium ions in brine from a level of several ppm to about 1.5%. At beginning brine is subjected to an adsorption, so that Li content is increased to 1200–1500 ppm, followed by two stages of electrodialysis in series to increase Li ions to about 1.5%. Li depleted solution from the second stage of electrodialysis having a Li content of 1200–1500 ppm is recycled to the first stage of electrodialysis as a feed. Li depleted water from the first stage of electrodialysis is subjected to a residue recovery electrodialysis to form a Li enriched solution of 1200–1500 ppm, which is also recycled to the first stage of electrodialysis as a feed. Li depleted solution from the residue recovery electrodialysis is recycled as a feed of the adsorption, so as to sufficiently recover Li ions from brine.

9 Claims, 2 Drawing Sheets

PROCESS FOR PRODUCING LITHIUM CONCENTRATE FROM BRINE OR SEAWATER

FIELD OF THE INVENTION

The present invention is related to a process for producing lithium carbonate from brine or seawater, and in particular to a process for producing lithium concentrate and lithium carbonate from brine or seawater by combining two concentration techniques of adsorption and electrodialysis.

BACKGROUND OF THE INVENTION

Due to its merits, such as a high electrical energy density, a high working voltage, a long cyclic life and no memory effect, etc., the lithium ion battery has been widely used in notebook computer, mobile phone, and electric cars, and the use amount thereof will grow in multiples. In addition, many different lithium compounds have been utilized in various industries, such as ceramic industry, glass industry, aluminum electrolysis melting industry and synthetic rubber industry. Among them the most popular lithium compound is lithium carbonate, and many lithium compounds are derived from lithium carbonate. Therefore, lithium carbonate is one of the most important lithium compounds.

Currently, two different sources of raw materials are used to produce lithium carbonate, which are lithium ores and brine. In a country like Taiwan where no nature resource of lithium ores can be found, seawater is the only alternative resource for producing lithium carbonate. Seawater can be used directly or after concentrated, i.e. brine, wherein seawater has a lithium concentration of about 0.1–0.5 ppm, and brine has a lithium concentration of about 10 ppm. In order to form lithium carbonate precipitate from an aqueous solution containing lithium ions, the concentration thereof must be 15000 ppm or higher, which is much higher than those of seawater and brine. Consequently, there is a great interest in developing a technique for raising the lithium ion concentration of the seawater or brine to a level of 15000 ppm required for producing lithium carbonate.

U.S. patent application Ser. No. 10/173,177, which is filed 18 Jun. 2002 and commonly assigned with the present invention, discloses a method for adsorbing lithium ions from a lithium-containing aqueous solution by an adsorbent. The method comprises contacting a lithium-containing aqueous solution to an adsorbent of lithium-containing manganese oxide, so that lithium ions in the aqueous solution are adsorbed on the adsorbent, characterized in that said lithium-containing aqueous solution has a pH value not less than 10. Preferably, said adsorbent of lithium-containing manganese oxide comprises $LiMn_2O_4$ or $Li_2MnO_3$. The entire content of this application is incorporated herein by reference. The lithium concentrate produced according to the method of this application is restricted to a level of about 1500 ppm. Therefore, there is a need to develop a process for further enriching the lithium concentration from 1500 ppm to about 15000 ppm, a minimum concentration suitable for producing lithium carbonate.

U.S. Pat. No. 4,636,295 discloses a process for producing a lithium enriched solution having a Mg:Li ratio of 5:1 or lower by using a number of electrodialysis steps from brine. In addition, compounds are added to the enriched solution, a filtration operation is required to reduce the amount of Mg ions contained therein, and a final electrodialysis step is carried out to enrich the lithium content to a level of 15.5 g/L, about 1.5%.

A primary object of the present invention is to provide a process for producing lithium concentrate from brine or seawater with a high recovery of lithium ions and free of a solid waste.

SUMMARY OF THE INVENTION

In order to accomplish the aforesaid object a process for producing a lithium concentrate from brine according to the present invention comprises the following steps:

a) introducing brine into an adsorbent bed so that lithium ions are more strongly adsorbed on an adsorbent of said adsorbent bed in comparison with ions of Na, K, Ca and Mg;

b) introducing water into said adsorbent bed so that ions of Na, K, Ca and Mg adsorbed on said adsorbent are desorbed therefrom;

c) introducing an acidic solution into said adsorbent bed so that the lithium ions more strongly adsorbed on the adsorbent are desorbed therefrom, and thus a solution having a lithium concentration of 1200–1500 ppm is obtained;

d) enriching lithium ions in the solution having a lithium concentration of 1200–1500 ppm from step c) to a lithium concentration of 6000–10000 ppm by electrodialysis; and e) enriching lithium ions in the enriched solution having a lithium concentration of 6000–10000 ppm resulting from step d) to a lithium concentration of 14000–18000 ppm by electrodialysis.

In the process of the present invention, a lithium depleted solution having a lithium concentration of 1200–1500 ppm is formed after the electrodialysis in step e), and said process further comprises recycling said lithium depleted solution having a lithium concentration of 1200–1500 ppm to the electrodialysis in step d) as a feed.

In the process of the present invention, a lithium depleted solution having a lithium concentration of 250–400 ppm is formed after the electrodialysis in step d), and said process further comprises enriching lithium ions in said lithium depleted solution having a lithium concentration of 250–400 ppm to a lithium concentration of 1200–1500 ppm by a residue recovery electrodialysis; and recycling the enriched solution having a lithium concentration of 1200–1500 ppm resulting from said residue recovery electrodialysis to the electrodialysis in step d) as a feed. Preferably, a lithium depleted solution having a lithium concentration of 10–100 ppm formed after the residue recovery electrodialysis is recycled to said adsorption bed in step a) as a feed.

DETAILED DESCRIPTION OF THE INVENTION

Figure 1:
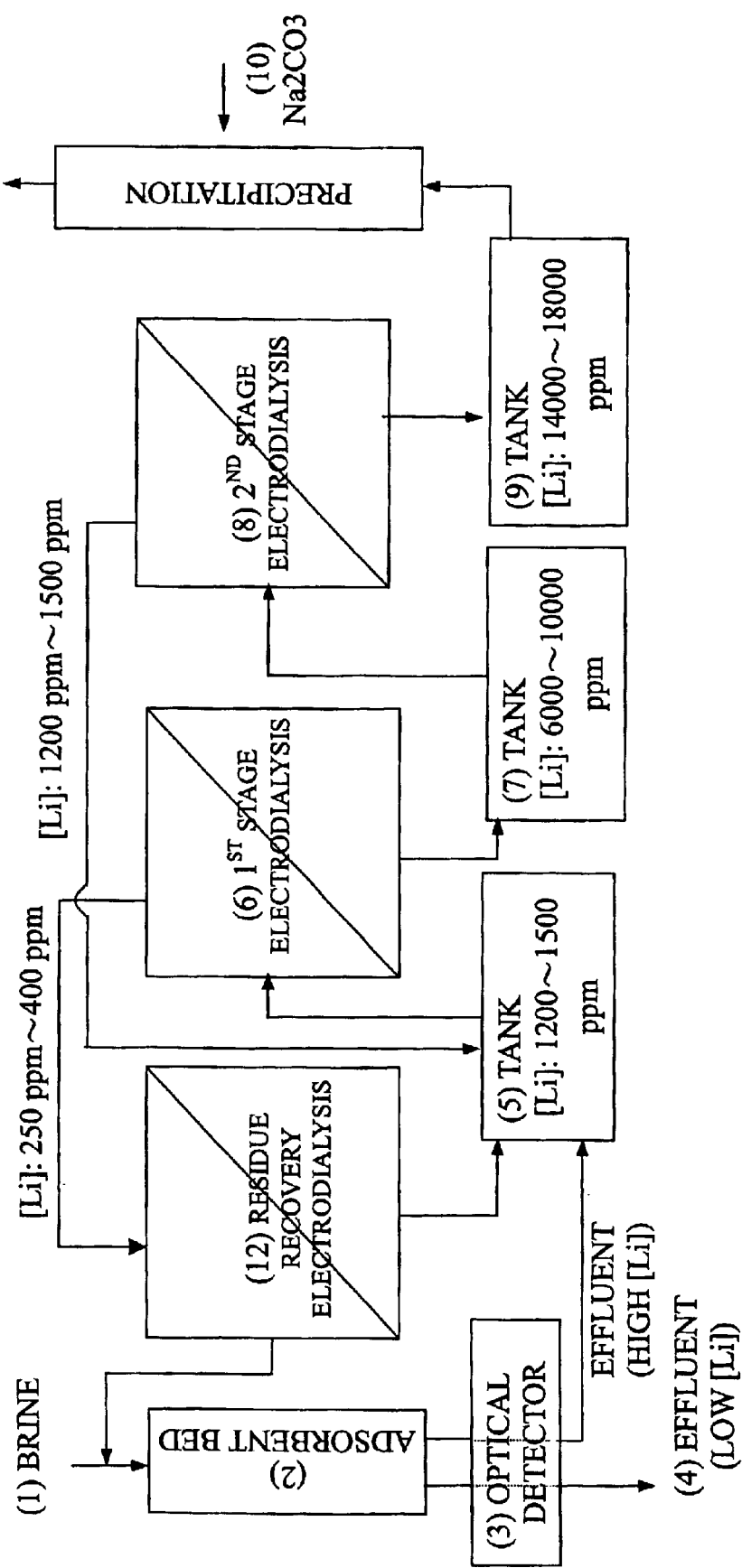
FIG. 1 is a schematic block diagram showing a process according to a preferred embodiment of the present invention.

In the process according to the present invention, two concentration techniques of adsorption and electrodialysis, are combined to enrich lithium ions in brine, generated from a salt producing process or a pure water producing process from seawater, from a level of several ppm to about 1.5%, a concentration sufficiently high for forming lithium carbonate. At beginning brine is subjected to an adsorption, so that Li content is increased to 1200–1500 ppm, followed by two stages electrodialysis in series to enrich Li ions to about 1.5%.

Preferably, an alkali such as sodium hydroxide is added to said brine so that said brine has a pH value of 10–11 prior to conducting said adsorption in the process of the present invention, so that the saturated amounts of Li ions adsorbed per gram of adsorbent can be enhanced.

A suitable adsorbent for use in the present invention is a granular adsorbent comprising powder of lithium-containing manganese oxide, and a polymer as a binder. Said binder can be (but not limited to) poly(vinyl chloride)

The adsorbent of lithium-containing manganese oxide used in the process of the present invention comprises (but not limited to) $LiMn_2O_4$ or $Li_2MnO_3$.

A suitable process for preparing said powder of lithium-containing manganese oxide is disclosed in U.S. Pat. No. 4,665,049, details of which are incorporated herein by reference.

A suitable process for preparing said granular adsorbent of lithium-containing manganese oxide is disclosed in Japanese patent publication No.3-008439, details of which are incorporated herein by reference.

The process of the present invention can use brine generated from a salt producing process or a pure water producing process from seawater or seawater directly, which is introduced into a column packed with an adsorbent for lithium ions. The resulting saturated adsorbent column is subjected to water wash and an acidic solution wash in sequence so as to obtain a desorbed solution rich in lithium ions. During the water wash the ions of Na, K, Ca and Mg weakly adsorbed on the adsorbent are desorbed, and the water wash is continued until the desorbed solution has a concentration of each Na, K, Ca and Mg ions lower than 10 ppm. The acidic solution wash such as a diluted HCl solution is to desorbed the lithium ions relatively strongly adsorbed on the adsorbent, while detecting the lithium concentration of the effluent from the adsorbent column with an optical detector. The lithium concentration of the effluent is related to a transmittance of a light beam passing through the effluent, so that by using the optical detector we can collect only the effluent having a transmittance lower than a predetermined value to assure that the solution collected has a lithium concentration greater than a predetermine value and a reduced amount of impurity ions.

Effluent having a lithium concentration of 1200–1500 ppm collected from the acidic solution wash is subjected to two stages of electrodialysis to enrich lithium ions to a concentration of about 1.5%. A lithium depleted solution having a lithium concentration of 1200–1500 ppm formed during the second stage electrodialysis is recycled to the first stage electrodialysis as a feed. A lithium depleted solution formed during the first stage electrodialysis is subjected to a residue recovery electrodialysis to form a lithium enriched solution having a lithium concentration o 1200–1500 ppm, which is also recycled to the first stage electrodialysis as a feed. A lithium depleted solution formed during the residue recovery electrodialysis is recycled to said adsorption column as a feed. Therefore, Li ions in brine or seawater are sufficiently recovered.

A suitable electrodialysis apparatus for use in the process of the present invention can be any one known in the art, for example the electrodialysis apparatus disclosed in U.S. Pat. No. 3,063,924, details of which are incorporated herein by reference.

Figure 2:
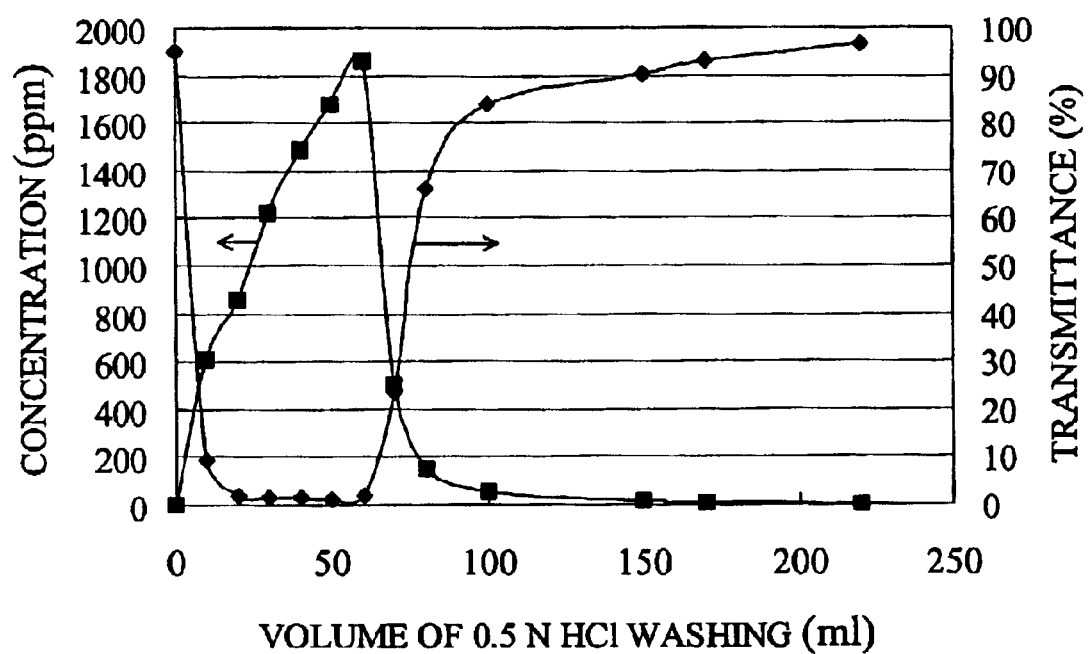
FIG. 2 is a plot showing the relation between the lithium concentration (-■-) of a desorbed effluent from an adsorbent bed and the light transmittance (-♦-) in course of desorbing the adsorbent bed with 0.5 N HCl solution.

A preferred embodiment of the present invention will be described in conjunction with FIG. 1. Brine 1, generated from a NaCl and KCl production plant using seawater, is introduced to an adsorbent column 2 packed with a granular adsorbent of lithium-containing manganese oxide, wherein adsorption occurs. The space hourly speed of brine 1 is controlled within 18~40 L/hr. The adsorption rate is low if the space hourly speed of brine 1 is lower than 18 L/hr. On the other hand, the lithium recovery will be reduced if the space hourly speed of brine 1 is higher than 40 L/hr. The lithium concentrations of brine influent and effluent of the adsorbent column 2 are compared, and the brine influent is stopped when the comparison shows the two concentrations are close, i.e. the adsorbent column 2 is saturated. The saturated adsorbent column 2 is washed with water to desorb massive amounts of impurity ions of Na, K, Ca and Mg adsorbed on the adsorbent, wherein only little lithium ions are desorbed at the same time. The adsorbent column 2 is further washed with 0.5~1.0 N HCl aqueous solution to desorb the remaining lithium ions on the adsorbent, while detecting the lithium concentration of the effluent with an optical detector 3. The lithium concentration of the effluent becomes high if a transmittance of a light beam of 760 nm passing through the effluent decreases, as shown in FIG. 2. The collection of the effluent is started at a point when the transmittance profile turns flat, the transmittance decreasing to a value lower than 2%, and the lithium concentration increasing to a value greater than 800 ppm. In course of desorbing the lithium concentration of the effluent decreases, and the transmittance thereof increases. The collection of the effluent is stopped when the transmittance thereof reaches 2%. The collected effluent has a lithium concentration significantly higher than those of Na, K, Ca and Mg ions. The desorbed effluent 4 from the adsorbent column 2 which is not collected is recycled to the feed brine 1 to recover the remaining lithium ions therein. After the stop of the collection of the effluent, the 0.5~1.0 N HCl wash can be continued to a point when the transmittance reaches 96%, lithium concentration lower than 2 ppm, so that the capacity of the adsorbent is resumed. Alternatively, the 0.5~1.0 N HCl wash is stopped right after the stop of the collection of the effluent, and another cycle of adsorption is carried out by introducing brine 1 to the adsorbent column 2.

The desorbed effluent having a lithium concentration of 1200–1500 ppm is collected in a tank 5. The solution having a lithium concentration of 1200–1500 ppm is withdrawn from the tank 5 to a first stage electrodialysis apparatus 6 operated at a constant voltage of 15–20 V, so that a lithium enriched solution having a lithium concentration of 6000–10000 ppm is formed by electrodialysis, and is collected in a tank 7. The solution having a lithium concentration of 6000–10000 ppm is withdrawn from the tank 7 to a second stage electrodialysis apparatus 8 operated at a constant voltage of 15–20 V, so that a lithium enriched solution having a lithium concentration of 14000–18000 ppm is formed by electrodialysis, and is collected in a tank 9. To the solution having a lithium concentration of 14000–18000 ppm sodium carbonate 10 is added at downstream of the tank 9, and lithium carbonate 11 is formed.

A lithium depleted solution having a lithium concentration of 1200–1500 ppm is also formed after the electrodialysis in the second stage electrodialysis apparatus 8, which is introduced to the tank 5 as a feed for the first stage electrodialysis apparatus 6. A lithium depleted solution having a lithium concentration of 300–400 ppm is also formed after the electrodialysis in the first stage electrodialysis apparatus 6, and it is introduced to a residue recovery electrodialysis apparatus 12 operated at a constant voltage of 20–25 V to form a lithium enriched solution having a lithium concentration which is close to that of the solution in the tank 5. The lithium enriched solution from the residue recovery electrodialysis apparatus 12 is introduced to the tank 5 as a feed of the first stage electrodialysis apparatus 6. A lithium depleted solution having a lithium concentration of 50–100 ppm is formed after electrodialysis in the residue recovery electrodialysis 12, which is recycled to join brine 1 as a feed to the adsorbent column 2, so that the effluent collected from the adsorbent column 2 is fully utilized.

If a difference between the concentrations of the feed solution and the enriched solution becomes too big during electrodialysis, the efficiency of electrodialysis is adversely affected due to occurrence of reverse osmosis. In the process of the present invention the lithium ions are enriched stage-by-stage to avoid reverse osmosis at one single stage, so that an improved efficiency of electrodialysis can be achieved. Further, a lithium depleted solution generated at each stage of electrodialysis is recycled and used in the process itself. Therefore, the process of the present invention is substantially free of contaminants and is a clean process.

Without further elaboration, it is believed that the above description has adequately enabled the present invention. The following specific example is, therefore, to be construed as merely illustrative, and not limitative of the remainder of the disclosure in any way whatsoever.

PREPARATION EXAMPLE 1

73 g poly(vinyl chloride) (PVC) having a polymerization degree of 620±20 was dissolved in 980 ml N-methyl-2-pyrrolidone (NMP). To the resulting PVC solution 300 g of $Li_{1.33}Ma_{1.67}O_4$ powder in spinel phase was added, and the mixture was then kneaded thoroughly. The kneaded mixture was added drop-by-drop through a capillary (diameter 3 mm) into 1200 ml of a mixed solution of methanol and water (1:1 by volume), and granules having a diameter of 3.5–4.3 mm were formed. The granules and the liquid of the mixture were separated by filtration. The resulting wet granules were dried in vacuo, dry granular adsorbent having a density 0.41 g/cm$^3$ was yielded.

EXAMPLE 1

40 g of the granular adsorbent prepared in Preparation Example 1 after being immersed in deionized water was packed in a column to form an adsorbent bed. The adsorbent bed was washed with deionized water, 1300 ml of 0.5 N HCl and deionized water prior to conducting an adsorption. Brine available from a seawater salt production plant was introduced to the adsorbent bed at a space velocity of 35 L/hr. After 14 days of introduction of brine influent the adsorbent bed was saturated. The saturated adsorbent bed was desorbed by washing with 120 ml of deionized water at a space velocity of 3 L/hr, and with 1.0 N HCl.

The desorbed effluent was monitored by an optical detector, wherein a transmittance of a light having 760 nm wavelength passing through the effluent. was measured. The effluent having a transmittance lower than 2% was collected, which has a lithium concentration higher than 800 ppm. The concentrations of metals ions in the collected effluent and the feed brine are listed in Table 1.

TABLE 1

| Concentration of ion (ppm) | Li | Na | K | Ca | Mg |
| --- | --- | --- | --- | --- | --- |
| Brine | 9~12 | 29100 | 37000 | 17700 | 35300 |
| Desorbed effluent | 1484 | 109 | 144 | 154 | 246 |

An electrodialysis devic sold by ANSANICS Co., Ltd., Japan, under a code name of DS-0 was used in the following electrodialysis.

The first stage electrodialysis: The effluent having a lithium concentration of 1484 ppm was filled into a dilute tank, 5 L of the same effluent was filled into a concentrate tank, and 10 L of 0.5 N sodium sulfate solution was filled into an electrode rinse tank as a electrode rinse solution. The effluent in the dilute tank was continuously introduced into an inlet of a dilute cell of the electrodialysis apparatus at a flow rate of 7.6 L/min, which then exit from an outlet of the dilute cell and returned to the dilute tank. The effluent in the concentrate tank was continuously introduced into an inlet of a concentrate cell of the electrodialysis apparatus at a flow rate of 7.2 L/min, which then exit from an outlet of the concentrate cell and returned to the concentrate tank. The 0.5 N sodium sulfate solution in the electrode rinse tank was continuously introduced into an inlet of an electrode cell of the electrodialysis apparatus at a flow rate of 6.8 L/min, which then exit from an outlet of the electrode cell and returned to the electrode rinse tank. The flow rates used were related to the specification of the electrodialysis apparatus. The electrodialysis was carried out with a constant voltage of 23 V for 300 minutes, and in course of electrodialysis the effluent having a lithium concentration of 1484 ppm was supplied to the dilute tank as a supplement at a flow rate of 150 ml/min, as a result of that an overflow having the same flow rate was collected from the dilute tank. At the end of 300-minute electrodialysis, the concentrate collected from the concentrate tank had a lithium concentration of 9540 ppm, and a lithium depleted solution collected from the overflow and the dilute tank had a lithium concentration of about 290 ppm. The recovery of lithium ions from the effluent having a lithium concentration of 1484 ppm is higher than 80%.

The second stage electrodialysis: 10 L of the concentrate having a lithium concentration of 9540 ppm from the first stage electrodialysis was filled into the dilute tank, 10 L of the same concentrate was filled into the concentrate tank, and 10 L of 0.5 N sodium sulfate solution was filled into an electrode rinse tank as a electrode rinse solution. The second stage electrodialysis was conducted under the same conditions as the first stage electrodialysis, except that no supplement was supplied to the dilute tank during electrodialysis, the voltage and the period of time of the electrodialysis were 20 V and 270 minutes respectively. At the end of 270-minute electrodialysis, the concentrate formed in the concentrate tank had a lithium concentration of 17250 ppm, and a lithium depleted solution collected from the dilute tank had a lithium concentration of about 1320 ppm, which was recycled and used as a feed to the first stage electrodialysis. The recovery of lithium ions from the concentrate having a lithium concentration of 9540 ppm is about 85%.

Residue recovery electrodialysis: The lithium depleted solution having a lithium concentration of about 290 ppm from the first stage electrodialysis was filled into the dilute tank, 5 L of the same lithium depleted solution was filled into the concentrate tank, and 10 L of 0.5 N sodium sulfate solution was filled into an electrode rinse tank as a electrode rinse solution. The residue recovery electrodialysis was conducted under the same conditions as the first stage electrodialysis, except that the supplement supplied to the dilute tank was at a flow rate of 200 m/min during electrodialysis, the voltage and the period of time of the electrodialysis were 30 V and 60 minutes respectively. At the end of 60-minute electrodialysis, the concentrate formed in the concentrate tank had a lithium concentration of 1270 ppm, and a lithium depleted solution collected from the overflow and the dilute tank had a lithium concentration of about 37 ppm, wherein the former was recycled and used as a feed to the first stage of electrodialysis and the latter was recycled and joined with brine as a feed to the adsorbent bed. The recovery of lithium ions is about 85%.

The concentrations of metals ions in the concentrate generated from each of the above-mentioned electrodialysis are listed in table 2

TABLE 2

| Stage | Conc. (ppm) | | | | |
|---|---|---|---|---|---|
| | Li | Na | K | Ca | Mg |
| First stage electrodialysis | 9450 | 2333 | 882 | 959 | 1561 |
| Second stage electrodialysis | 17250 | 3820 | 2049 | 2114 | 2776 |
| Residue recovery electrodialysis | 1270 | 788 | 343 | 515 | 528 |

What is claimed is:

1. A process for producing a lithium concentrate from brine comprising the following steps:
   a) introducing brine into an adsorbent bed so that lithium ions are more strongly adsorbed on an adsorbent of said adsorbent bed in comparison with ions of Na, K, Ca and Mg;
   b) introducing water into said adsorbent bed so that ions of Na, K, Ca and Mg adsorbed on said adsorbent are desorbed therefrom;
   c) introducing an acidic solution into said adsorbent bed so that the lithium ions more strongly adsorbed on the adsorbent are desorbed therefrom, and thus a solution having a lithium concentration of 1200–1500 ppm is obtained;
   d) enriching lithium ions in the solution having a lithium concentration of 1200–1500 ppm from step c) to a lithium concentration of 6000–10000 ppm by electrodialysis; and
   e) enriching lithium ions in the enriched solution having a lithium concentration of 6000–10000 ppm resulting from step d) to a lithium concentration of 14000–18000 ppm by electrodialysis.

2. The process according to claim 1, wherein a lithium depleted solution having a lithium concentration of 1200–1500 ppm is formed after the electrodialysis in step e), and said process further comprises recycling said lithium depleted solution having a lithium concentration of 1200–1500 ppm to the electrodialysis in step d) as a feed.

3. The process according to claim 2, wherein a lithium depleted solution having a lithium concentration of 250–400 ppm is formed after the electrodialysis in step d), and said process further comprises enriching lithium ions in said lithium depleted solution having a lithium concentration of 250–400 ppm to a lithium concentration of 1200–1500 ppm by a residue recovery electrodialysis; and recycling the enriched solution having a lithium concentration of 1200–1500 ppm resulting from said residue recovery electrodialysis to the electrodialysis in step d) as a feed.

4. The process according to claim 3, wherein a lithium depleted solution having a lithium concentration of 10–100 ppm is formed after the residue recovery electrodialysis, and said process further comprises recycling said lithium depleted solution having a lithium concentration of 10–100 ppm to said adsorption bed in step a) as a feed.

5. The process according to claim 1, wherein said adsorbent is a granular adsorbent comprising powder of lithium-containing manganese oxide, and a polymer as a binder.

6. The process according to claim 5, wherein said binder is poly(vinyl chloride).

7. The process according to claim 5, wherein said adsorbent of lithium-containing manganese oxide comprises $LiMn_2O_4$ or $Li_2MnO_3$.

8. The process according to claim 1, wherein an alkali is added to said brine so that said brine has a pH value of 10–11 prior to being introduced to said adsorbent bed in step a).

9. the process according to claim 8, wherein said alkali is NaOH.

* * * * *